(12) United States Patent
Krivenok

(10) Patent No.: US 12,438,843 B1
(45) Date of Patent: Oct. 7, 2025

(54) NETWORKED SYSTEM WITH PROTECTION FROM EFFECTS OF NETWORK ADDRESS CONFLICTS

(71) Applicant: Dell Products L.P., Round Rock, TX (US)

(72) Inventor: Dmitry Vladimirovich Krivenok, Dublin (IE)

(73) Assignee: Dell Products L.P., Round Rock, TX (US)

( * ) Notice: Subject to any disclaimer, the term of this patent is extended or adjusted under 35 U.S.C. 154(b) by 55 days.

(21) Appl. No.: 18/625,701

(22) Filed: Apr. 3, 2024

(51) Int. Cl.
  *H04L 61/5046* (2022.01)
  *H04L 61/103* (2022.01)
  *H04L 101/659* (2022.01)

(52) U.S. Cl.
  CPC ........ *H04L 61/5046* (2022.05); *H04L 61/103* (2013.01); *H04L 2101/659* (2022.05)

(58) Field of Classification Search
  None
  See application file for complete search history.

(56) References Cited

U.S. PATENT DOCUMENTS

| | | |
|---|---|---|
| 9,699,034 B2 | 7/2017 | Lee |
| 9,736,016 B2 | 8/2017 | Brandwine |
| 10,382,401 B1 | 8/2019 | Lee et al. |
| 11,088,916 B1 | 8/2021 | Chandrashekhar et al. |
| 2005/0047350 A1* | 3/2005 | Kantor .................... H04L 41/12 370/254 |
| 2006/0259639 A1* | 11/2006 | Aken ...................... H04L 69/16 709/245 |
| 2008/0225875 A1* | 9/2008 | Wray .................. H04L 12/4633 370/419 |
| 2009/0248896 A1* | 10/2009 | Cohn .................... H04L 61/103 718/1 |
| 2013/0097692 A1* | 4/2013 | Cooper .................. H04L 63/10 726/14 |
| 2014/0314086 A1* | 10/2014 | Roper ..................... H04L 45/54 370/392 |
| 2017/0149614 A1* | 5/2017 | Zheng ................. H04L 63/0263 |
| 2018/0124074 A1* | 5/2018 | Natarajan ........... H04L 63/1441 |
| 2018/0131584 A1* | 5/2018 | Garg ..................... H04L 61/103 |
| 2019/0020537 A1* | 1/2019 | Sharma .............. H04L 41/0806 |

(Continued)

Primary Examiner — Phyllis A Book
(74) Attorney, Agent, or Firm — BainwoodHuang

(57) ABSTRACT

Nodes of a protected system perform protected network address discovery by establishing a management overlay network using static network addresses not subject to network discovery, and using the overlay network to communicate application-level network address information among the protected nodes. Each protected node operates to (1) maintain a store of the application-level network address information from the overlay network, and instantiate protective packet filters at node ports, and (2) in response to an outgoing network address discovery request, (a) use a packet filter to consult the store and retrieve target network address information for a target of the discovery request, and (b) make an on-node response with the target network address information without forwarding the discovery request out to the substrate network. Network discovery is thus protected from the effects of potential network address conflicts involving the other nodes, which may be outside the control of the protected system.

20 Claims, 3 Drawing Sheets

(56) References Cited

U.S. PATENT DOCUMENTS

| | | | |
|---|---|---|---|
| 2019/0081882 A1* | 3/2019 | Iqbal | H04L 45/306 |
| 2020/0259831 A1* | 8/2020 | Pampati | H04L 63/0281 |
| 2021/0021455 A1* | 1/2021 | Casado | H04L 41/0859 |
| 2022/0279021 A1 | 9/2022 | Raleigh | |
| 2024/0146685 A1* | 5/2024 | Zhang | H04L 45/127 |

\* cited by examiner

NETWORKED SYSTEM WITH PROTECTION FROM EFFECTS OF NETWORK ADDRESS CONFLICTS

BACKGROUND

The present invention is related to the field of data networks, and in particular to data networks having complex structure and functionality in which network address conflicts may occur with potentially adverse operational consequences.

SUMMARY

Disclosed is a method of providing network address discovery for a set of protected nodes of a substrate network in the presence of network address conflicts between the protected nodes and other nodes in the substrate network, such network address conflicts occurring for application-level networks carried by the substrate network. The method generally includes establishing a management overlay network among the protected nodes in the substrate network using static network addresses not subject to network discovery, and using the management overlay network to communicate application-level network address information among the protected nodes. Each of the protected nodes operates to (1) use the application-level network address information communicated from the other protected nodes to maintain a store of the application-level network address information, and instantiate protective packet filters at corresponding ports of the node. Each protected node further operates to (2) in response to an outgoing application-level network address discovery request at a port of the node, (a) use the port-associated packet filter to consult the store and retrieve target application-level network address information for a protected-node component being a target of the discovery request, and (b) make an on-node response to the discovery request with the target application-level network address information without forwarding the discovery request out to the substrate network. By this technique, network discovery is protected from the effects of potential network address conflicts involving any of the other nodes of the system, which may be outside the control of the protected system.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Overview

Figure 1:
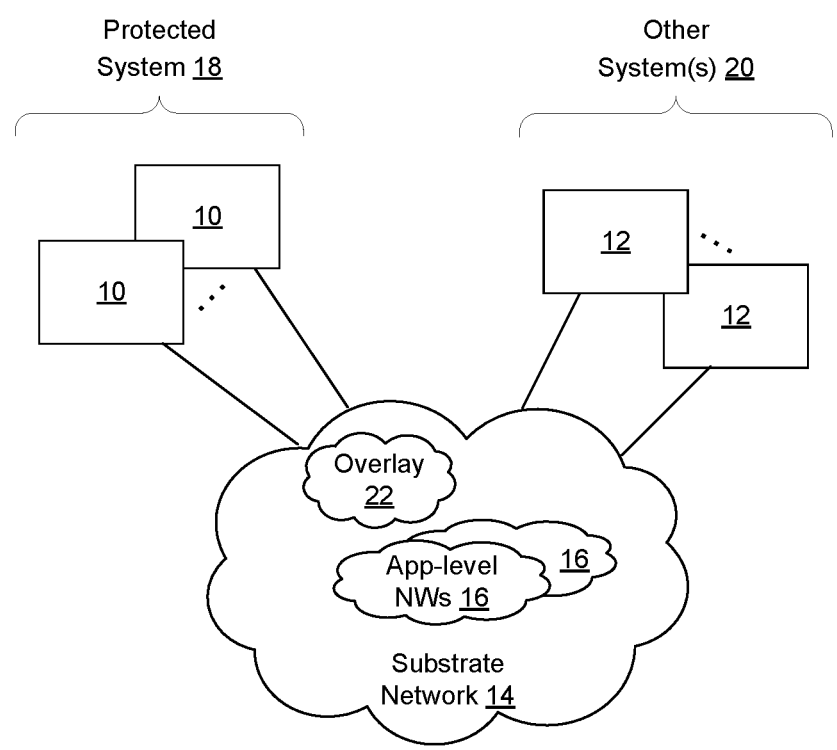
FIG. 1 is a block diagram of a distributed computing system including a protected system employing an overlay network as described herein.

A complex clustered computing system may use multiple IPv4 or IPv6 networks to communicate among nodes of the system for the purposes of management, control, backup, replication, etc. Nodes of such systems may be connected to network fabrics shared with other systems (e.g., storage systems, hypervisors, bare-metal hosts, networking equipment, security appliances, etc.) which are completely independent and are outside of the clustered system's control. In such heterogeneous environments, it can be relatively common for network address conflicts to occur, e.g., simultaneous use by two separate nodes/systems of the same network-level address (e.g., IPv4 or IPv6 address). When such conflicts happen, they typically lead to intermittent network failures, which can be hard to diagnose and correct. In the context of storage clusters, such failures may lead to degraded performance, management or data unavailability, and other issues.

Approaches exist to implement address conflict detection (ACD) based on address resolution protocol (ARP) and network discovery (ND) protocols. However, even though detection is useful in a troubleshooting process, it does not itself avoid the connectivity disruption that arises when conflicts exist (either due to mistakes or malicious actions). Many systems available in the market today do not even have network validation functionality which provides for detecting network address conflicts. This leads to hard-to-triage intermittent connectivity issues that can result in management and/or data unavailability. And even though some advanced systems (e.g., Dell PowerStore storage clusters) support network validation and detection of IP address conflicts, which can simplify troubleshooting and eventual correction of such issues, network address conflicts still occur and can cause connectivity disruption until they are resolved.

Thus, a presently disclosed technique is directed to avoiding the impact of network address conflicts on protected nodes of a clustered system that is deployed in a larger complex system that may exhibit such network address conflicts, e.g., when sharing a network fabric/substrate with other networked systems outside the control of the clustered system. In particular, the disclosed technique includes use of a specialized network overlay and smart packet filtering at the nodes of the clustered system, as described below. The technique does not require that all clustered system nodes be interconnected via an internal or hidden out-of-band (OOB) management network. It employs a specialized network overlay to communicate control plane information like IP/MAC mappings, in which the overlay network itself is protected from network address conflicts. The technique does not require use of specialized network hardware (e.g., a dedicated processor (DPU) capable of ARP proxy functionality), although it may be implemented using such hardware if available. It also supports typical on-premises datacenter requirements such as having trunk and hybrid ports attached to multiple VLANs which may have overlapping IP address ranges, as well as multiple subnets behind a single port. Generally, the technique assumes that the clustered system's control plane takes care of network address management for the system and that it assigns network addresses to VMs, containers and applications running on the nodes.

Embodiments

FIG. 1 shows a distributed computing system in which a plurality of computing nodes 10, 12 are interconnected by a network shown as a substrate network 14, also referred to as a "fabric". The substrate network 14 provides physical interconnections as well as lower-level network functionality, e.g., through network layer (layer 3) in the well-known ISO hierarchical description. As shown the substrate network 14 carries traffic of application-visible networks shown as app-level networks (NWs) 16, examples of which are given below. The collection of nodes 10 are shown as being part of a protected system 18, while the nodes 12 are part of other systems 20, examples of which are also given below. The protected-system nodes 10 (also referred to herein as "protected nodes") co-operate in a particular manner to realize certain protection against network address conflicts, as described more below, and to that end they utilize a specialized overlay network 22 in the substrate network 14.

The application-level networks 16 are generally user configurable. They may employ IPv4 or IPv6 addressing and may be attached to different ports and different VLANs. Different networks 16 may share the same ports or use dedicated ports. These networks 16 are utilized by applications, containers or virtual machines running on nodes 10, 12. Network address management may be done in a cloud-like way with the system's control plane implementing subnets, virtual network interfaces, etc.

In one embodiment, the protected system 18 is a complex clustered computing system (e.g., a distributed data storage system) using multiple application-level networks 16 (IPv4 or IPv6) to communicate among the nodes 10 for purposes such as management, control, backup, replication, etc. The nodes 12 of the other systems 20 may include any of a variety of equipment types, e.g., storage systems, hypervisors, bare-metal hosts, networking equipment, security appliances, etc., utilizing other application-level networks 16 while being completely independent and outside of the control of the protected system 18. As noted above, this environment creates the risk of network address conflicts, such as when different network management components in two separate systems 18, 20 inadvertently allocate the same network-level address(es) (e.g., IP addresses) to different nodes 10, 12.

The overlay network 22 serves as a mechanism for reliably communicating the network address information (e.g., IP/MAC address pairs) within the protected system 18. The use of an overlay 22 leverages the existing substrate network 14 without requiring an entirely separate out-of-band network for such purposes. In one embodiment, to make the configuration of the overlay network 22 fully automatic and transparent, IPv6 unique local addresses (ULAs) are used. As generally known, IPv6 ULAs are a range of addresses with an assigned prefix that are usable as "private network" addresses, i.e., addresses that are not externally reachable or routable.

When a protected-system node 10 is initially configured, a unique IPv6 ULA address is generated and persisted. This IP address is immutable and never changes for the lifetime of the node 10. It is configured on top of a network port with an assumption that all nodes 10 are attached to the same VLAN via selected interfaces. There is no requirement for fully homogeneous ports configuration on each node 10. Whenever a new node 10 is added to the system 18, every other node 10 receives the IPv6 ULA address and the MAC address of the new node's control plane. This IP/MAC pair remains unchanged until the node is decommissioned, or until the port is physically replaced as part of FRU/CRU process. In the former case, every node 10 removes the pair from local persistence. In the latter case, when a new MAC address of a new port is detected, it is sent to all other nodes 10 to replace the prior IP/MAC pair with the new one.

Each node 10 populates a local neighboring-node cache with static entries for each IPv6/MAC pair it receives for the other nodes 10 of the overlay network 22. The use of static addresses effectively disables network discovery protocol for the overlay network 22 itself, which means that connectivity and communication between the nodes 10 are not disrupted even if the same IPv6 address is configured on some other node 12 of one of the other systems 20. This provides a communication mechanism with fully automatic addressing and resilience to external IP conflicts.

When a new application-level network address (e.g., IP address) is allocated and assigned to a particular application in the protected system 18, the relevant network address information is distributed to all other nodes 10 via the overlay network 22. This information includes the application-level IP address itself, the MAC address of the port where this IP address is configured, a user-defined tag of the network, and an identifier of the VLAN (if any) of the corresponding network.

Control plane software running on each node 10 maintains information about every remote IP address in the system. For every IP address it receives from other node's control plane it performs the following:

It identifies all physical ports with matching network tag (for example, some ports may be tagged with "mgmt" tag, and some may be tagged with "replication" tag).

It populates a packet filter map (e.g., eBPF map, see below) with information about IP address, i.e., the mapping

{IP, VLAN}→MAC

It attaches a packet filter program (e.g., eBPF) to each port with matching network tag.

The packet filter program uses the network address information from the packet filter map to respond to outgoing ARP or ND requests in a manner that shields the nodes 10 from the effects of address conflicts, as described below. In one embodiment, the packet filter program and map may be realized using a program known as "extended Berkeley packet filter" or eBPF. eBPF programs may be compiled into bytecode and securely executed by an in-kernel BPF virtual machine. Those programs may be attached to multiple objects in the kernel such as kprobes, cgroups, and network interfaces. In this disclosure, eBPF programs are attached to network interfaces. eBPF maps are in-kernel data structures which may be read and modified by both user-space programs and eBPF programs.

Figure 2:
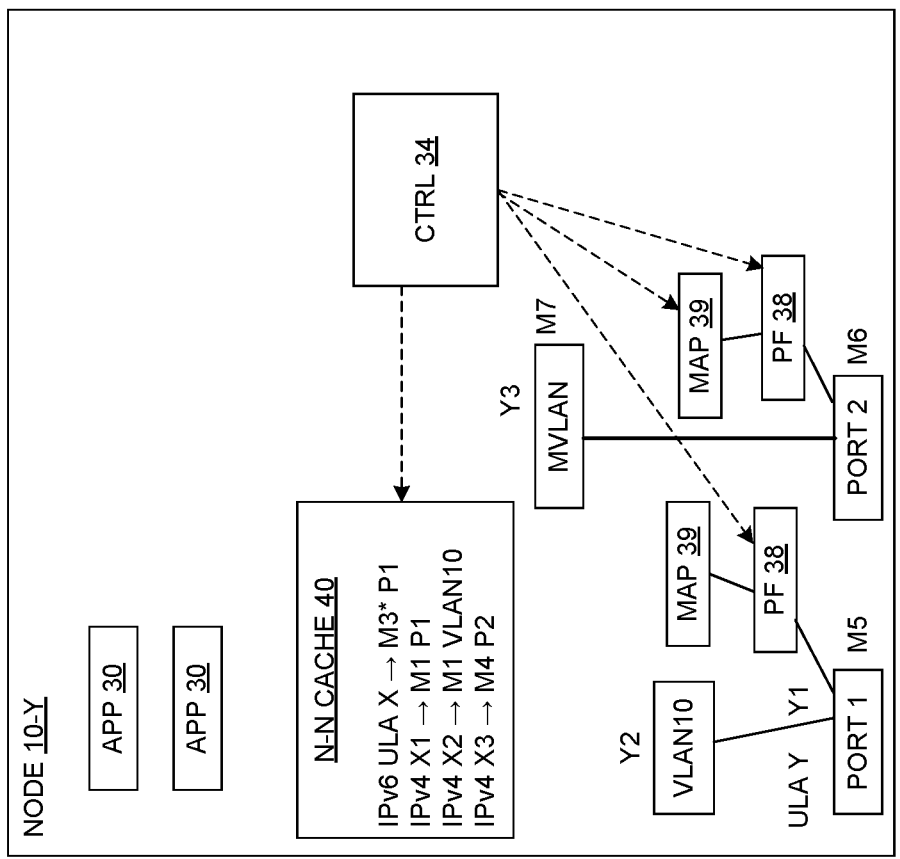
FIG. 2 is a detailed schematic diagram of a simplified example having two protected nodes.
Figure 2:
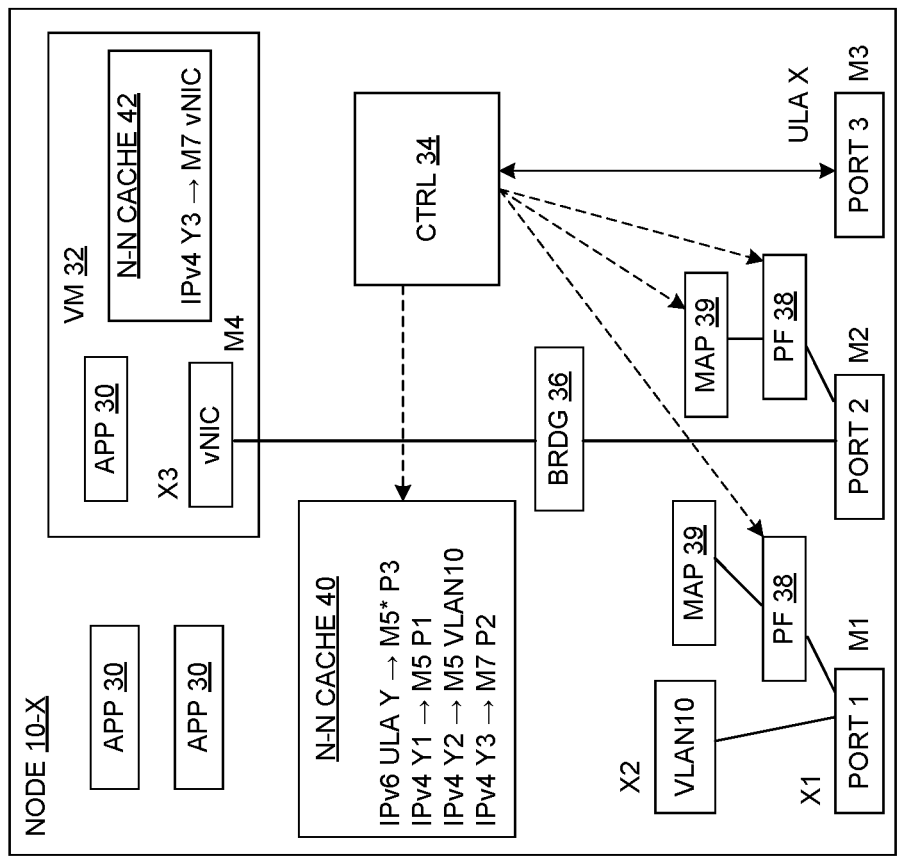

FIG. 2 illustrates relevant aspects of the protected-system nodes 10 using a simple 2-node example (two nodes 10-X and 10-Y shown). Each node 10 runs applications 30 and VMs 32. Each node 10 also runs certain control plane functions shown as CTRL 34, which communicate with each other via IPv6 ULA addresses (X and Y in this example, on Port 3 for node 10-X and Port 1 for node 10-Y). In this example, several application-level IP addresses X1, X2, . . . and Y1, Y2, . . . are configured directly on associated network ports (PORT 1, etc.), on logical devices such as VLAN10 and MACVLAN, as well as on a virtual network interface card (vNIC) inside a VM 32 (attached to PORT 2 via a bridge interface 36). Physical-layer addresses of these ports and components are shown as respective MAC addresses M1, M2, M3, . . . . All addresses are configured by the control component 34 of each node 10. At each node 10, local application-level address pairs (IPv4/MAC) are communicated to the other nodes 10 where it is used to populate packet filter maps as described below.

The control component 34 of each node 10 also attaches a packet-filter (PF) program 38 (e.g., eBPF) and populates an associated PF map 39 (e.g., eBPF map) with information it receives from the other nodes 10. Each node 10 also builds and maintains a cache of neighboring-node network address pairs (e.g., IP/MAC pairs) shown as a neighboring-node (N-N) cache 40. These include address pairs for the overlay network 22 (e.g., IPv6 ULA addresses) as well as for the application-level networks 16 (e.g., IPv4 addresses), as shown.

More specifically, during initialization as well as in response to local network information changes (e.g., reconfiguration), the control component 34 of each protected-system node 10 communicates local network address information to the other nodes 10 of the protected system to enable them to populate and use packet-filter maps as described more below. In the simple example of FIG. 2, nodes 10-X and 10-Y communicate as follows:

1. Node 10-X to node 10-Y:
   a. P1: IPv4 X1/M1
   b. P1: IPv4 X2/M1 (VLAN ID: VLAN10)
   c. P2: IPv4 X3/M4
2. Node 10-Y to node 10-X:
   a. P1: IPv4 Y1/M5
   b. P1: IPv4 Y2/M5 (VLAN ID: VLAN10)
   c. P2: IPv4 Y3/M7

The control component 34 of each node populates its local PF maps 39 with the address information received from all other nodes 10 of the protected system 18, for use by the associated PF programs 38 as described below. In the simple example of FIG. 2, the PF maps 39 of node 10-X contain the three information items communicated from node 10-Y (items 2a-2c above), and the PF maps 39 of node 10-Y contain the three information items communicated from node 10-X (items 1a-1c above).

In operation, a PF program 38 looks at all outgoing ARP/ND packets, which may be generated by the node OS kernel, guest OS kernel (of a VM 32) or directly by the applications 30 for example. It extracts VLAN ID (if present) from the Ethernet header as well as IP address from ARP/ND header. Then it does a lookup in the corresponding PF map 39, which has been populated with network address information obtained via the overlay network 22 as described above. In eBPF, this lookup may be performed using a helper tool bpf_map_lookup_elem. If a match is found, then the PF program 38 modifies the packet buffer by transforming the ARP/ND request to a reply, including the MAC address obtained from the PF map 39 (in eBPF, this function may be done using bpf_skb_store_bytes). The reply in the packet buffer is then sent back to the local originator or initiator of the request (local OS, VM, app, etc.), such as by using a redirect call bpf_redirect(skb→ifindex, BPF_F_INGRESS) in eBPF. The request initiator receives the reply and uses its content to create a corresponding application-level network address entry in the N-N cache 40.

Thus, overall operation is to transparently intercept outgoing ARP/ND request packets and generate replies without the request packets leaving the node 10. The requestor (e.g., OS kernel) populates the N-N cache 40 with the correct IP to MAC address entries from the replies, enabling local network functions to form complete Ethernet packets and send them to their destinations in substrate network 14. Note that this approach works for the node's OS kernel, and it also works for any virtual machines 32 running on the node 10 (VM guest kernel receives the ARP/ND reply packet just as it would a real reply). It also works for any hierarchy of virtual devices sitting on top of network ports (e.g., VLAN devices, bridges, bonds, etc.) which may be in different network namespaces with separate N-N caches. An example is shown in FIG. 2, in which the VM 32 has its own N-N cache 42 for the mapping of IPv4 Y3 to M7 via the local vNIC.

In the above operation, if the PF map lookup fails (no match found), then the PF program 38 can handle such requests in a more conventional manner, e.g., by returning TC_ACT_OK status to the local requestor and then sending the packet out onto the substrate network 14, and later forwarding an associated reply when received.

Using the disclosed technique, communication within the protected system 18 is consistent regardless of any IP address conflicts outside of the protected system 18. All applications running on nodes 10 will talk to the correct IP address because the PF map 39 will have an accurate, non-conflicting entry for it.

In connection with the handling of outgoing ARP/ND request packets as described above, in some embodiments a separate PF program may also be used for additional protection. These PF programs can be attached to the ingress side of the network ports. Given the filtering of outgoing request packets as described above, a node 10 should normally not receive any ARP/ND replies for IP/VLAN addresses in the local PF map. Thus, for received ARP/ND replies, this PF program performs PF map lookups and blocks any incoming ARP/ND replies for matching IPs/VLANs. This protects the N-N cache 40 from erroneous or malicious ARP/ND replies generated by external hosts. When no match is found, a received reply packet may be forwarded on to a local requestor (OS, VM, etc.) for use in populating an ARP/ND cache.

If protected-system nodes 10 have heterogeneous network connectivity where the same network may be configured as access port on node N1 and trunk port on N2, then the control plane 34 running on the nodes 10 does not include VLAN ID in the map when VLAN is configured as access VLAN or as native VLAN on trunk/hybrid port.

Figure 3:
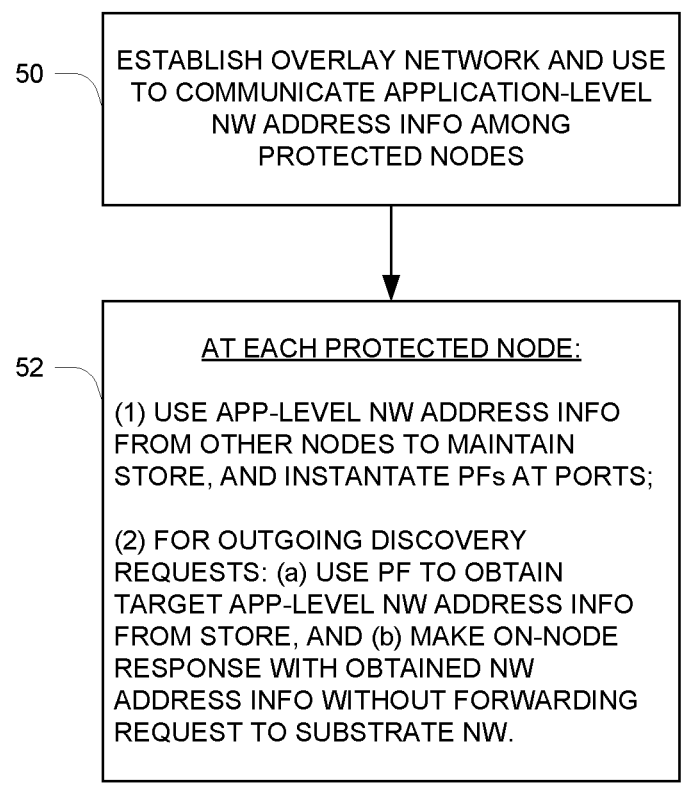
FIG. 3 is a high-level flow diagram of operation of the protected nodes.

FIG. 3 illustrates relevant operation at a high level. Overall, the technique provides for network address discovery for a set of protected nodes (e.g., protected-system nodes 10) of a substrate network (e.g., 14) in the presence of network address conflicts between the protected nodes and other nodes (e.g., nodes 12) in the substrate network, wherein the network address conflicts occur for application-level networks (e.g., 16) carried by the substrate network.

At 50, a management overlay network (e.g., 22) is established among the protected nodes in the substrate network using static network addresses not subject to network discovery, and the management overlay network is used to communicate application-level network address information among the protected nodes.

At 52, each of the protected nodes operates to (1) use the application-level network address information communicated from the other protected nodes to maintain a store (e.g., PF maps 39) of the application-level network address information, and instantiating protective packet filters (e.g., 38) at corresponding ports of the node. Each node further operates to (2) in response to an outgoing application-level network address discovery request at a port of the node, (a) use the port-associated packet filter to consult the store and obtain (retrieve) target application-level network address information for a protected-node component which is the target of the discovery request (e.g., an app 30 etc. of a remote protected node 10), and (b) make an on-node response to the discovery request with the target application-level network address information without forwarding the discovery request out to the substrate network.

The above approach is generally transparent to applications, containers and VMs running on the protected-system nodes 10. As described, each node 10 does need to run a control plane component (e.g., control 34) which populates the PF map, attaches the PF programs to ports, and configures/manages the internal network overlay (local data/functions of the overlay network 22). As noted, this approach can also be extended to make it completely transparent when the nodes 10 have programmable smart NICs or DPUs. In this case, the control plane component 34 may be offloaded to such smart NIC or DPU which is programmed to redirect outgoing ARP/ND packets to a local device CPU that generates reply packets etc. as described above. In this configuration, the approach works fully transparently to node 10.

The following are potential advantages of the proposed solution:

- The approach does not require any changes to applications, containers or VMs running inside protected-system nodes 10.
- The approach does not require dedicated OOB management network, instead leveraging an automatically configured internal network overlay based on selected addressing scheme (e.g., IPv6 ULA).
- The approach works well for arbitrary complex virtual device topology as well as with virtual machines running in bridged network mode. There is no need to know anything about guest OS or modify its neighboring cache at all.

While various embodiments of the invention have been particularly shown and described, it will be understood by those skilled in the art that various changes in form and details may be made therein without departing from the scope of the invention as defined by the appended claims.

What is claimed is:

1. A method of providing network address discovery for a set of protected nodes of a substrate network in the presence of network address conflicts between the protected nodes and other nodes in the substrate network, the network address conflicts occurring for application-level networks carried by the substrate network, comprising:
    establishing a management overlay network among the protected nodes in the substrate network using static network addresses not subject to network discovery, and using the management overlay network to communicate application-level network address information among the protected nodes; and
    at each of the protected nodes:
    (1) using the application-level network address information communicated from the other protected nodes to maintain a store of the application-level network address information, and instantiating protective packet filters at corresponding ports of the node; and
    (2) in response to an outgoing application-level network address discovery request at a port of the node, (a) using the port-associated packet filter to consult the store and retrieve target application-level network address information for a protected-node component being a target of the discovery request, and (b) making an on-node response to the discovery request with the target application-level network address information without forwarding the discovery request out to the substrate network.

2. The method of claim 1, wherein the network address conflicts include multiple mappings for different nodes of a single network-level address to corresponding distinct physical-layer addresses.

3. The method of claim 1, wherein the static network addresses of the management overlay network are IPv6 unique local addresses having a predefined prefix value and used as private, non-globally-routable network addresses.

4. The method of claim 1, wherein the store at each protected node is a set of packet-filter maps each associated with a corresponding port and used by a corresponding packet filter.

5. The method of claim 1, wherein discovery request and reply are address-resolution-protocol (ARP) request and reply used to learn a physical-layer network address of a network node utilizing a network-layer address contained in the ARP request.

6. The method of claim 1, wherein the protected nodes are nodes of a clustered system under common control of network usage, and wherein the other nodes are nodes of other systems outside the common control of network usage.

7. The method of claim 1, wherein at least some of the protected nodes contain respective specialized processing hardware configured and operative to perform the operations 2(*a*) and 2(*b*) of the packet filter.

8. The method of claim 7, wherein the specialized processing hardware is a smart network interface card or dedicated processor.

9. The method of claim 1, wherein step 2(*b*) is performed only in response to a match condition in which the target application-level network address information is contained in the store, and further including, in response to a second outgoing application-level network address discovery request at the port of the node, (a) using the port-associated packet filter to consult the store and fail to retrieve second target application-level network address information for a second protected-node component, due to a non-match condition, and (b) based on the non-match condition, forwarding the second address discovery request out to the substrate network for eventual reply by a separate node thereof.

10. The method of claim 1, further including: (1) instantiating second protective packet filters at an ingress side of the respective ports, and (2) using a second protective packet filter in response to receiving a network address discovery reply from the substrate network to (a) consult the store to determine whether the reply is for an application-level network having application-level network address information in the store, and (b) in response to a match condition in which the application-level network address information is in the store, refrain from forwarding the network address discovery reply further in the node to protect integrity of a local network cache of network address information.

11. A computerized device configured and operative, as one of a set of protected nodes in a substrate network, to provide network address discovery for the protected nodes in the presence of network address conflicts between the protected nodes and other nodes in the substrate network, the network address conflicts occurring for application-level networks carried by the substrate network, by:
    co-operating with the other protected nodes to establish a management overlay network among the protected nodes using static network addresses not subject to network discovery, and using the management overlay network to communicate application-level network address information among the protected nodes;
    using the application-level network address information communicated from the other protected nodes to maintain a store of the application-level network address information, and instantiating protective packet filters at corresponding ports of the node; and
    in response to an outgoing application-level network address discovery request at a port of the node, (a) using the port-associated packet filter to consult the store and retrieve target application-level network address information for a protected-node component being a target of the discovery request, and (b) making an on-node response to the discovery request with the target application-level network address information without forwarding the discovery request out to the substrate network.

12. The computerized device of claim 11, wherein the network address conflicts include multiple mappings for different nodes of a single network-level address to corresponding distinct physical-layer addresses.

13. The computerized device of claim 11, wherein the static network addresses of the management overlay network are IPv6 unique local addresses having a predefined prefix value and used as private, non-globally-routable network addresses.

14. The computerized device of claim 11, wherein the store at each protected node is a set of packet-filter maps each associated with a corresponding port and used by a corresponding packet filter.

15. The computerized device of claim 11, wherein discovery request and reply are address-resolution-protocol (ARP) request and reply used to learn a physical-layer network address of a network node utilizing a network-layer address contained in the ARP request.

16. The computerized device of claim 11, wherein the protected nodes are nodes of a clustered system under common control of network usage, and wherein the other nodes are nodes of other systems outside the common control of network usage.

17. The computerized device of claim 11, wherein the computerized device contains specialized processing hardware configured and operative to perform the operations (a) and (b) of the packet filter.

18. The computerized device of claim 17, wherein the specialized processing hardware is a smart network interface card or dedicated processor.

19. The computerized device of claim 11, wherein step (b) is performed only in response to a match condition in which the target application-level network address information is contained in the store, and wherein the computerized device is further configured and operative for a second outgoing application-level network address discovery request at the port of the node, to (a) use the port-associated packet filter to consult the store and fail to retrieve second target application-level network address information for a second protected-node component, due to a non-match condition, and (b) based on the non-match condition, forward the second address discovery request out to the substrate network for eventual reply by a separate node thereof.

20. The computerized device of claim 11, further configured and operative to (1) instantiate second protective packet filters at an ingress side of the respective ports, and (2) use a second protective packet filter in response to receiving a network address discovery reply from the substrate network to (a) consult the store to determine whether the reply is for an application-level network having application-level network address information in the store, and (b) in response to a match condition in which the application-level network address information is in the store, refrain from forwarding the network address discovery reply further in the node to protect integrity of a local network cache of network address information.

* * * * *